(12) United States Patent
Cassidy et al.

(10) Patent No.: US 10,904,232 B2
(45) Date of Patent: *Jan. 26, 2021

(54) PROVIDING A BOOTING KEY TO A REMOTE SYSTEM

(71) Applicant: Palantir Technologies Inc., Palo Alto, CA (US)

(72) Inventors: Justin Cassidy, San Jose, CA (US); Tristan Smith, Sunnyvale, CA (US); Kori Oliver, Vienna, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,912

(22) Filed: Sep. 5, 2019

(65) Prior Publication Data

US 2019/0394182 A1 Dec. 26, 2019

Related U.S. Application Data

(63) Continuation of application No. 15/188,784, filed on Jun. 21, 2016, now Pat. No. 10,498,711.

(Continued)

(51) Int. Cl.
*G06F 21/57* (2013.01)
*H04L 29/06* (2006.01)
(Continued)

(52) U.S. Cl.
CPC .......... *H04L 63/061* (2013.01); *G06F 9/4416* (2013.01); *G06F 9/45558* (2013.01); *G06F 21/575* (2013.01); *H04L 63/029* (2013.01)

(58) Field of Classification Search
CPC .... G06F 21/575; G06F 9/4406; G06F 9/4416; G06F 9/45558; G06F 9/4401; H04L 9/08;
(Continued)

(56) References Cited

U.S. PATENT DOCUMENTS

| 5,978,478 A | 11/1999 | Korematsu |
| 6,253,203 B1 | 6/2001 | O'Flaherty et al. |

(Continued)

FOREIGN PATENT DOCUMENTS

| CN | 101729531 A | 6/2010 |
| CN | 103281301 A | 9/2013 |

(Continued)

OTHER PUBLICATIONS

"About Virus Total", [Online]. Retrieved from the Internet: <http//www.virustotal.com/about.html>, (Jun. 30, 2014), 8 pgs.

(Continued)

*Primary Examiner* — Jaweed A Abbaszadeh
*Assistant Examiner* — Brian J Corcoran
(74) *Attorney, Agent, or Firm* — Schwegman Lundberg & Woessner, P.A.

(57) ABSTRACT

Aspects of the present disclosure relate to providing a booting key to a remote system. A policy server receives a verification that a predetermined number of user devices provided secret information for booting a remote system. The policy server provides, in response to the received verification, a message for a key server to provide a booting key to the remote system, the key server providing the booting key in response to the message and causing the remote system to complete a booting procedure, in response to the message from the policy server.

20 Claims, 4 Drawing Sheets

Related U.S. Application Data (60) Provisional application No. 62/339,556, filed on May 20, 2016.

(51) Int. Cl.
*G06F 9/4401* (2018.01)
*G06F 9/455* (2018.01)

(58) Field of Classification Search
CPC ....... H04L 9/083; H04L 9/0844; H04L 9/321; H04L 63/029; H04L 63/0428; H04L 63/061; H04L 63/062
See application file for complete search history.

(56) References Cited

U.S. PATENT DOCUMENTS

| | | | |
|---|---|---|---|
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,596,285 B2 | 9/2009 | Brown | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,104,865 B2 | 8/2015 | Seacat Deluca et al. | |
| 9,335,897 B2 | 5/2016 | Goldenberg | |
| 9,338,013 B2 | 5/2016 | Castellucci et al. | |
| 10,498,711 B1 | 12/2019 | Cassidy et al. | |
| 2002/0112157 A1 | 8/2002 | Doyle et al. | |
| 2004/0123139 A1 | 6/2004 | Aiello et al. | |
| 2004/0153418 A1 | 8/2004 | Hanweck | |
| 2004/0250124 A1 | 12/2004 | Chesla | |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-zotov et al. | |
| 2006/0031928 A1 | 2/2006 | Conley | |
| 2006/0069912 A1 | 3/2006 | Zheng et al. | |
| 2006/0149962 A1 | 7/2006 | Fountain et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0242711 A1 | 10/2006 | Anzai et al. | |
| 2006/0265747 A1 | 11/2006 | Judge | |
| 2007/0136807 A1 | 6/2007 | Deliberato et al. | |
| 2007/0143851 A1 | 6/2007 | Nicodemus et al. | |
| 2007/0168311 A1 | 7/2007 | Genty et al. | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2008/0273706 A1 | 11/2008 | Noll | |
| 2009/0103442 A1 | 4/2009 | Douville | |
| 2009/0228701 A1 | 9/2009 | Lin | |
| 2009/0328222 A1 | 12/2009 | Helamn et al. | |
| 2010/0077481 A1 | 3/2010 | Polyakov et al. | |
| 2010/0082991 A1 | 4/2010 | Baldwin et al. | |
| 2010/0100963 A1 | 4/2010 | Mahaffey | |
| 2010/0179831 A1 | 7/2010 | Brown et al. | |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0202555 A1 | 8/2011 | Cordover et al. | |
| 2011/0219450 A1 | 9/2011 | Mcdougal et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0179904 A1 | 7/2012 | Dunn et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | Mcdougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0173900 A1 | 7/2013 | Liu | |
| 2013/0239217 A1 | 9/2013 | Kindler et al. | |
| 2014/0013451 A1 | 1/2014 | Kulka et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand et al. | |
| 2014/0173738 A1 | 6/2014 | Condry et al. | |
| 2014/0188895 A1 | 7/2014 | Wang et al. | |
| 2014/0201533 A1* | 7/2014 | Kruglick ............... H04L 63/062 713/171 |
| 2014/0229422 A1 | 8/2014 | Jain et al. | |
| 2014/0283107 A1 | 9/2014 | Walton et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castellucci et al. | |
| 2015/0205965 A1 | 7/2015 | Kilgallon et al. | |
| 2015/0220710 A1 | 8/2015 | Cherubini et al. | |
| 2015/0229664 A1 | 8/2015 | Hawthorn et al. | |
| 2015/0248563 A1 | 9/2015 | Alfarano | |
| 2015/0261847 A1 | 9/2015 | Ducott, III et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2016/0078229 A1 | 3/2016 | Gong et al. | |
| 2016/0164918 A1 | 6/2016 | Satish et al. | |
| 2016/0350535 A1 | 12/2016 | Garcia | |

FOREIGN PATENT DOCUMENTS

| | | |
|---|---|---|
| EP | 1962222 A2 | 8/2008 |
| EP | 2892197 A1 | 7/2015 |
| EP | 2897051 A2 | 7/2015 |
| EP | 2963578 A1 | 1/2016 |
| EP | 2985974 A1 | 2/2016 |
| NL | 2011642 C | 8/2015 |
| WO | WO-2005010685 A2 | 2/2005 |

OTHER PUBLICATIONS

"U.S. Appl. No. 14/033,076, Notice of Allowance dated Mar. 11, 2016", 17 pgs.

"U.S. Appl. No. 14/223,918, Non Final Office Action dated Jun. 8, 2015", 14 pgs.

"U.S. Appl. No. 14/223,918, Notice of Allowance dated Jan. 6, 2016", 12 pgs.

"U.S. Appl. No. 14/280,490, First Action Interview Pre-Interview Communication dated Jul. 24, 2014", 14 pgs.

"U.S. Appl. No. 14/473,860, Notice of Allowance dated Jan. 5, 2015", 13 pgs.

"U.S. Appl. No. 14/479,863, First Action Interview Pre-Interview Communication dated Dec. 26, 2014", 5 pgs.

"U.S. Appl. No. 14/490,612, Examiner Interview Summary dated Mar. 31, 2015", 7 pgs.

(56) References Cited

OTHER PUBLICATIONS

"U.S. Appl. No. 14/490,612, First Action Interview Pre-Interview Communication dated Jan. 27, 2015", 16 pgs.
"U.S. Appl. No. 14/731,312, First Action Interview Pre-Interview Communication dated Apr. 14, 2016", 14 pgs.
"U.S. Appl. No. 14/816,748, First Action Interview Pre-Interview Communication dated Apr. 1, 2016", 5 pgs.
"U.S. Appl. No. 14/816,748, First Action Interview Pre-Interview Communication dated May 24, 2016", 8 pgs.
"U.S. Appl. No. 14/823,935, First Action Interview Pre-Interview Communication dated Dec. 4, 2015", 9 pgs.
"U.S. Appl. No. 14/823,935, Notice of Allowance dated Apr. 25, 2016", 5 pgs.
"U.S. Appl. No. 14/923,712, Non Final Office Action dated Feb. 12, 2016", 18 pgs.
"U.S. Appl. No. 14/970,317, First Action Interview Pre-Interview Communication dated Mar. 21, 2016", 9 pgs.
"U.S. Appl. No. 14/970,317, Notice of Allowance dated May 26, 2016", 6 pgs.
"U.S. Appl. No. 14/982,699, First Action Interview Pre-Interview Communication dated Mar. 25, 2016", 9 pgs.
"U.S. Appl. No. 15/071,064, First Action Interview Pre-Interview Communication dated Jun. 16, 2016", 11 pgs.
"U.S. Appl. No. 15/188,784, Examiner Interview Summary dated Jan. 8, 2019", 3 pgs.
"U.S. Appl. No. 15/188,784, Examiner Interview Summary dated Apr. 26, 2019", 3 pgs.
"U.S. Appl. No, 15/188,784, Examiner Interview Summary dated Oct. 16, 2018", 3 pgs.
"U.S. Appl. No. 15/188,784, Final Office Action dated Mar. 19, 2019", 10 pgs.
"U.S. Appl. No. 15/188,784, Final Office Action dated Sep. 28, 2018". 9 pgs.
"U.S. Appl. No. 15/188,784, First Action Interview—Office Action Summary dated Jun. 12, 2018", 5 pgs.
"U.S. Appl. No. 15/188,784, First Action Interview—Pre-Interview Communication dated May 4, 2018", 3 pgs.
"U.S. Appl. No. 15/188,784, Non Final Office Action dated Dec. 19, 2018", 10 pgs.
"U.S. Appl. No. 15/188,784, Notice of Allowance dated Jul. 29, 2019", 9 pgs.
"U.S. Appl. No. 15/188,784, Response filed Feb. 28, 2019 to Non Final Office Action dated Dec. 19, 2018", 12 pgs.
"U.S. Appl. No. 15/188,784, Response filed May 8, 2019 to Final Office Action dated Mar. 19, 2019", 11 pgs.
"U.S. Appl. No. 15/188,784, Response filed Nov. 8, 2018 to Final Office Action dated Sep. 28, 2018", 10 pgs.
"U.S. Appl. No. 15/188,784, Response filed Aug. 9, 2018 to First Action Interview—Office Action Summary dated Jun. 12, 2018", 9 pgs.
"European Application Serial No. 14199180.2, Extended European Search Report dated Aug. 31, 2015", 16 pgs.
"European Application No. 14199180.2, Partial European Search Report dated Jun. 22, 2015", 6 pgs.
"European Application No. 15175106.2, Extended European Search Report Nov. 5, 2015", 8 pgs.
"European Application No. 15180985.2, Extended European Search Report dated Jan. 15, 2016", 9 pgs.
"FireEye", Advanced Persistent Threat (APT) Attack & Zero-Day Protection | FireEye Malware Protection System, (accessed Jun. 30, 2014), 2 pgs.
"FireEye Products and Solutions Overview", [Online]. Retrieved from the Internet: <URL: http://www.fireeye.comproducts-and-solutions/, (Accessed Jun. 30, 2014), 2 pgs.
Baker, David W., et al., "The Development of a Common Enumeration of Vulnerabilities and Exposures", Presented at the Second International Workshop on Recent Advances in Intrusion Detection, (Sep. 1999), 1-35.
Bhuyan, Monowar H., et al., "Network Anomaly Detection: Methods, Systems and Tools", IEEE Communications Surveys & Tutorials, vol. 16., No. 1, (2014), 303-336.
Crosby, Scott A., et al., "Efficient Data Structures for Tamper-Evident Logging", Department of Computer Science, Rice University, (2009), 17 pgs.
Glaab, Enrico, et al., "EnrichNet: network-based gene set enrichment analysis", Bioinformatics 28.18, (2012), i451-i457.
Hur, Junguk, et al., "SciMiner: web-based literature mining tool for target identification and functional enrichment analysis", Bioinformatics 25.6, (2009), 838-840.
Lee, Wenke, et al., "A Data Mining and CIDF Based Approach for Detecting Novel and Distributed Intrusions", Recent Advances in Intrusion Detection: Lecture Notes in Computer Science, vol. 1907, (Nov. 11, 2000), pp. 49-65.
Ma, Di, et al., "A New Approach to Secure Logging", ACM Transactions on Storage; vol. 5, No. 1, Article 2, (Mar. 2009), 1-21.
Schneier, Bruce, et al., "Automatic event-stream notarization using digital signatures", Security Protocols; vol. 1189 of the series Lecture Notes in Computer Science, (Jun. 3, 2005), 155-169.
Schneier, Bruce, et al., "Cryptographic Support for Secure Logs on Untrusted Machines", The 7th Usenix Security Symposium Proceedings; USENIX Press, (Jan. 1998), 53-62.
Waters, Brent R, et al., "Building an Encrypted and Searchable Audit Log", Palo Alto Research Center, (Jan. 9, 2004), 11 pgs.
Zheng, Qi, et al., "GOEAST: a web-based software toolkit for Gene Ontology enrichment analysis", Nucleic Acids Research, 2008, vol. 36, Web Server issue, (May 16, 2008), W358-W63.
U.S. Appl. No. 15/188,784 U.S. Pat. No. 10,498,711, filed Jun. 21, 2016, Providing a Booting Key to a Remote System.

* cited by examiner

PROVIDING A BOOTING KEY TO A REMOTE SYSTEM

PRIORITY CLAIM

This application is a continuation of U.S. patent application Ser. No. 15/188,784, filed on Jun. 21, 2016, entitled "PROVIDING A BOOTING KEY TO A REMOTE SYSTEM," which claims priority to U.S. Provisional Patent Application No. 62/339,556, filed on May 20, 2016, entitled "PROVIDING A BOOTING KEY TO A REMOTE SYSTEM," the entire contents of which are incorporated herein by reference.

TECHNICAL FIELD

The subject matter disclosed herein relates to booting a physical or virtual computer system. In particular, example embodiments may relate to providing a booting key to a remote system, which may include a physical or virtual system.

BACKGROUND

Traditionally, when a client machine, such as a laptop or desktop computer, is booted, the client machine prompts the user to provide a key (e.g., enter a password). The client machine then waits for the user to provide the key and does not continue the boot procedure until the user provides the key. The client machine is unable to decrypt its booting instructions, which the client machine executes in order to boot, until the client machine receives the key.

This booting scheme requires a person who has access to the key to be physically present at the client machine in order to boot the client machine. However, in some cases, a remote client machine may need to be booted while system administrators, who have access to the key, are far away from the client machine. A naïve solution would be to remove the key and to permanently decrypt the booting instructions. However, this greatly reduces the security of the data on the client machine.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As set forth above, a new approach for accessing booting instructions at a remote client machine during booting may be desirable. The subject technology provides a new approach for accessing booting instructions at a remote system during booting. The remote system may include a physical system, such as a remote client machine or a remote server. Alternatively, the remote system may include a virtual system, a container, or a hypervisor. The subject technology may be implemented within a fully encrypted system, including an encrypted boot area.

Figure 1:
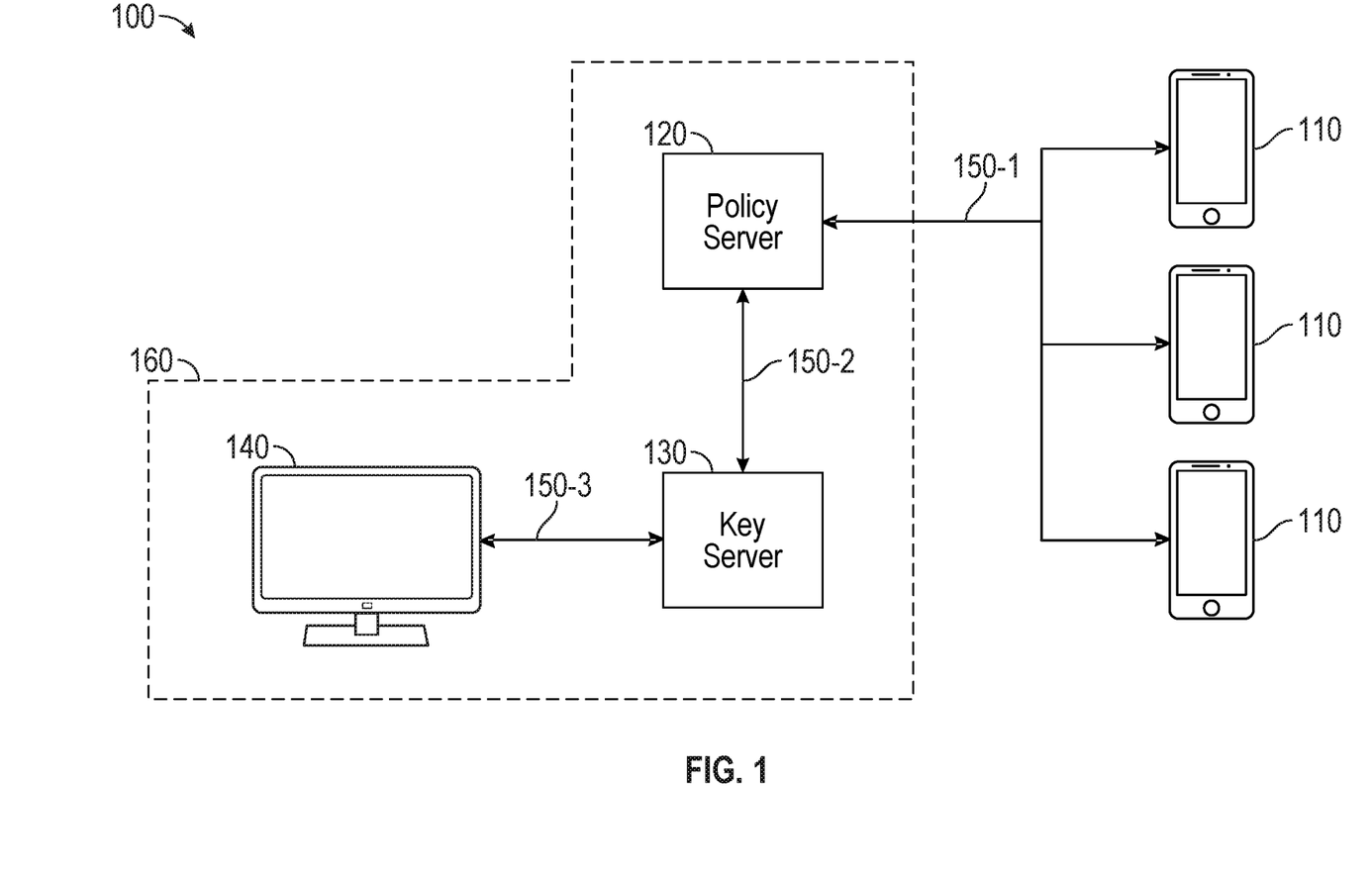
FIG. 1 is a diagram of an example system in which a booting key is provided to a remote system, according to some embodiments.

FIG. 1 is a diagram of an example system 100 in which a booting key is provided to a remote system, according to some embodiments. As shown, the system 100 includes user devices 110, a policy server 120, a key server 130, and a remote system 140. These machines communicate with one another via encrypted tunnels 150. As shown in FIG. 1, the policy server 120, the key server 130, and the remote system 140 reside within an encrypted boot area 160, which includes machines involved in booting the remote system 140 that communicate via the encrypted tunnels 150.

The user devices 110 may include one or more of a laptop computer, a desktop computer, a mobile phone, a tablet computer, a personal digital assistant (PDA), a digital music player, a smart watch, and the like. The user devices 110 may include any devices at which a user receives email, instant messages, short messaging service (SMS) messages, or other messages. According to some implementations, the user devices 110 belong to information technology personnel or system administrators of the remote system 140.

The remote system 140 may include a virtual system, a container, or a hypervisor. Alternatively, the remote system 140 may include a physical machine, such as a remote client machine (e.g., a laptop computer, a desktop computer, a mobile phone, a tablet computer, a personal digital assistant (PDA), a digital music player, a smart watch, and the like) or a remote server. The remote system 140 is illustrated in FIG. 1 as being a single machine. However, the remote system 140 may include a single physical machine, a single virtual machine, multiple physical machines, or multiple virtual machines. While a single remote system 140 is illustrated in FIG. 1, the subject technology may be implemented at multiple different remote systems.

As used herein, the phrase "virtual machine" encompasses its plain and ordinary meaning. For example, a virtual machine is a software emulation of a particular computer system that may be implemented in software, hardware, or a combination of software and hardware. As used herein, the term "hypervisor" encompasses its plain and ordinary meaning. For example, a hypervisor uses native execution to share and manage hardware, allowing multiple different environments, isolated from each other, to be executed on the same physical machine. As used herein, the term "container" encompasses its plain and ordinary meaning. For example, resources of a physical machine may be partitioned via the kernel's support for multiple isolated user space instances, which are referred to herein as containers. A container may appear like real machines to a remote end-user accessing the container.

The key server 130 stores multiple booting keys for multiple different remote systems, including the remote system 140. The key server 130 stores a mapping (e.g., a table, a hash table, a matrix, a linked list or another data structure) of remote system identifiers to booting keys. This mapping allows the key server 130 to assist in unlocking multiple different remote systems, including the remote system 140.

The subject technology may be implemented in conjunction with the system 100 of FIG. 1. The remote system 140 is rebooted (e.g., restarted). During the booting procedure, the remote system 140 notifies, via encrypted tunnel 150-3, the key server 130 that it needs a key to complete booting. The key server 130 then requests, from the policy server 120 via encrypted tunnel 150-2, authenticated information for providing the key to the remote system 140. The policy server 120 prompts, via encrypted tunnel 150-1, multiple user devices 110 (e.g., mobile phones or email addresses of system administrators) for secret information (e.g., a passcode, a pattern unlock or a biometric scan) indicating that it is ok to unlock the remote system 140. The policy server 120 receives, via encrypted tunnel 150-1, verification that at least a predetermined number (e.g., three) of the user devices 110 provided the secret information for unlocking the remote system 140. In response to the received verification, the policy server 120 provides, via encrypted tunnel 150-2, a message for the key server 130 to provide a booting key to the remote system 140. The message includes the authenticated information for providing the booting key to the remote system 140. In response to the message, the key server 130 provides the booting key to the remote system 140 via encrypted tunnel 150-3. In response to receiving the booting key, the remote system 140 becomes unlocked and completes the booting procedure.

In some cases, the system 100 includes the encrypted boot area 160 for the remote system 140 to communicate with the key server 130 via the encrypted tunnel 150-3, and for the key server 130 to communicate with the policy server 120 via encrypted tunnel 150-2. Furthermore, the communication within the system 100 may be accomplished via encrypted tunnels 150 to increase security and to protect the communicated information from eavesdroppers. The system 100 may be a fully encrypted system, and another running instance of the system 100 may be used to decrypt it. In some cases, there may be multiple (M, where M is a positive integer) instances of the system 100. If all M instances of the system 100 are offline, the first instance may be unlocked manually.

As shown in FIG. 1, the policy server 120 and the key server 130 are separate machines. However, in an alternative embodiment, the policy server 120 and the key server 130 may reside on the same machine. In this case, the encrypted tunnel 150-2 between the policy server 120 and the key server 130 is not needed.

Furthermore, while each of the policy server 120 and the key server 130 is illustrated as a single machine, each server 120/130 may include a single machine or multiple machines. Each server 120/130 may be implemented as a server farm including multiple machines.

Figure 2A:
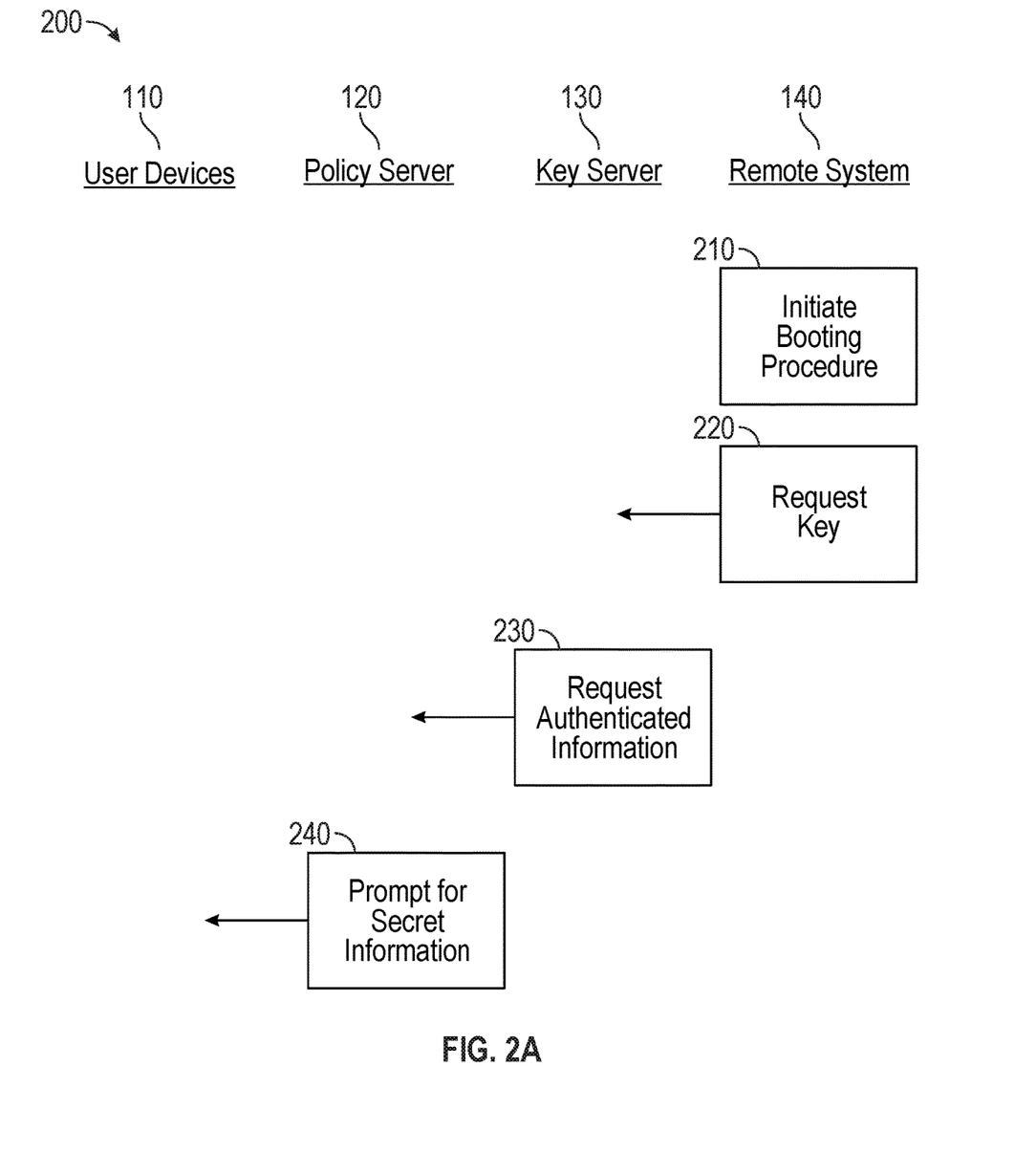
FIGS. 2A-2B are a data flow diagram illustrating an example method for providing a booting key to a remote system, according to some embodiments.
Figure 2B:
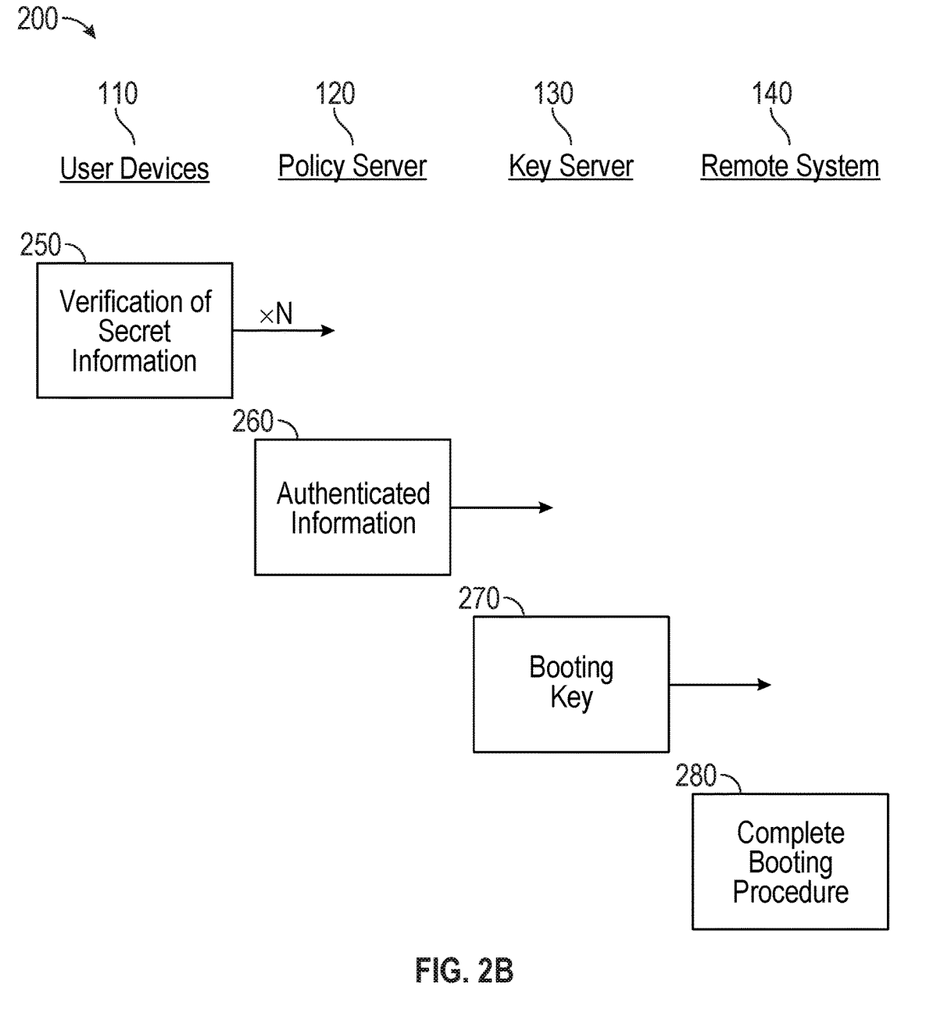

FIGS. 2A-2B are a data flow diagram illustrating an example method 200 for providing a booting key to a remote system, according to some embodiments. As shown, the method 200 is implemented with the user devices 110, the policy server 120, the key server 130, and the remote system 140.

As shown in FIG. 2A, the method 200 begins at operation 210, where the remote system 140 initiates a booting procedure. For example, the remote system 140 may initiate the booting procedure in response to being restarted.

At operation 220, the remote system 140 requests, via the encrypted tunnel 150-3, the booting key from the key server 130. The remote system 140 provides, to the key server 130, an indication that the remote system 140 has initiated the booting procedure. In some cases, the remote system 140 provides, to the key server 130, data from a log of the remote system 140. The data from the log indicates occurrences that occurred prior to the remote system 140 needing to reboot. The data may be useful in determining why the remote system 140 needed to reboot.

At operation 230, the key server 130, in response to the request for the booting key from the remote system 140, requests authenticated information, for transmitting the booting key to the remote system 140, from the policy server 120. The request is transmitted via the encrypted tunnel 150-2. In conjunction with the request for the authenticated information, the key server 130 provides to the policy server 120 an indication that the remote system 140 has initiated the booting procedure. In some cases, the key server 130 forwards the data from the log of the remote system 140 to the policy server 120.

At operation 240, the policy server 120 prompts, via the encrypted tunnel 150-1, the user devices 110 to provide secret information (e.g., a passcode, a pattern unlock or a biometric scan) in order to verify that the authenticated information is to be provided to the key server 130, and that the key server 130 is to provide the booting key to the remote server 140. According to some implementations, the user devices 110 belong to information technology personnel or system administrators of the remote system 140. In some cases, the policy server 120 prompts the user devices 110 to provide the secret information responsive to the indication that the remote system 140 has initiated the booting procedure. In some cases, the policy server 120 provides, to the user devices 110 together with the prompt for the secret information, the data from the log of the remote system 140, such that users of the user devices 110 can determine why the remote system 140 needed to reboot.

As shown in FIG. 2B, at operation 250, a predetermined number, N, of the user devices 110 verify the secret information and transmit, to the policy server 120 via the encrypted tunnel 150-1, an indication that the secret information has been verified. Alternatively, the secret information is transmitted to the policy server 120 and verified at the policy server 120. In another alternative, the secret information is transmitted to a third party server (not shown) and verified thereat. The third party server then transmits the verification to the policy server 120. The policy server requires verification of the secret information from N different user devices, where N is a predetermined positive integer, for example, three or five. N is less than or equal to the total number of user devices 110 belonging to information technology personnel or system administrators of the remote system 140. In some cases, the verification is transmitted to the policy server 120 by email using a mail server, for example, in response to an email message to an information technology personnel or a system administrator. In some cases, the verification is received via a push notification to the user devices 110 and to the policy server 120. In some cases, the number N is a fixed number (e.g., always 3). Alternatively, the number N may be set dynamically, for example, a system administrator may require that N=3 when a security threat level is normal, N=5 when the security threat level is heightened, and N=7 when the security threat level is exceptionally high or there are known security threats.

At operation 260, in response to receiving the verification of the secret information from the N user devices 110, the policy server 120 provides a message, via the encrypted tunnel 150-2, for the key server to provide the booting key to the remote system. The message includes the authentication information for providing the booting key to the remote system 140.

At operation 270, the key server 130 provides the booting key to the remote server 140 via the encrypted tunnel 150-3. The booting key is provided to cause the remote system 140 to complete the booting procedure. The booting key is provided in response to the message from the policy server of operation 260.

At operation 280, the remote system 140 completes the booting procedure using the booting key, which was provided to the remote system 140 by the key server 130 in response to the message from the policy server 120. After operation 280, the method 200 ends.

Figure 3:
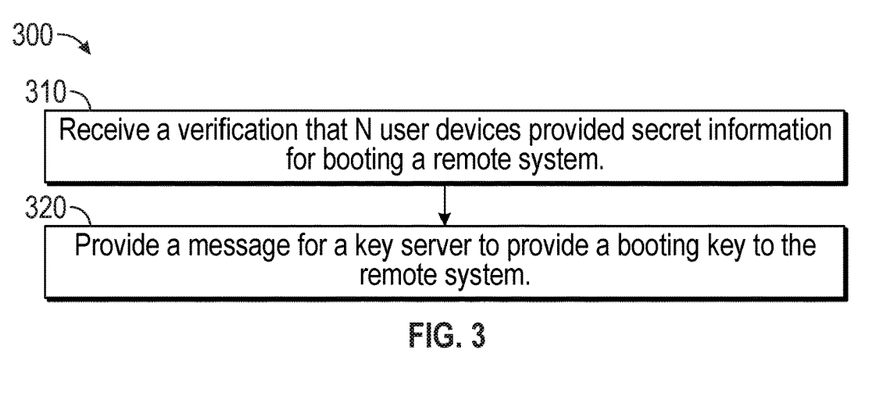
FIG. 3 is a flowchart illustrating an example method for providing a booting key to a remote system, according to some embodiments.

FIG. 3 is a flowchart illustrating an example method 300 for providing a booting key to a remote system, according to some embodiments. The method 300 is implemented at the policy server 120.

At operation 310, the policy server 120 receives a verification that N user devices 110 provided secret information for booting the remote system 140. N is a predetermined number, which is a positive integer and is less than or equal to a total number of user devices belonging to information technology personnel or system administrators authorized to access the remote system 140. In some cases, N may be greater than one, in order to ensure that, if a single device of an information technology personnel or system administrator is compromised, other personnel or administrators still approve the rebooting of the remote system 140.

At operation 320, the policy server 120 provides, in response to the received verification, a message for the key server 130 to provide a booting key to the remote system 140. The key server 130 provides the booting key to the remote system 140 in response to the message. The booting key causes the remote system 140 to complete a booting procedure. After operation 320, the method 300 ends.

Figure 4:
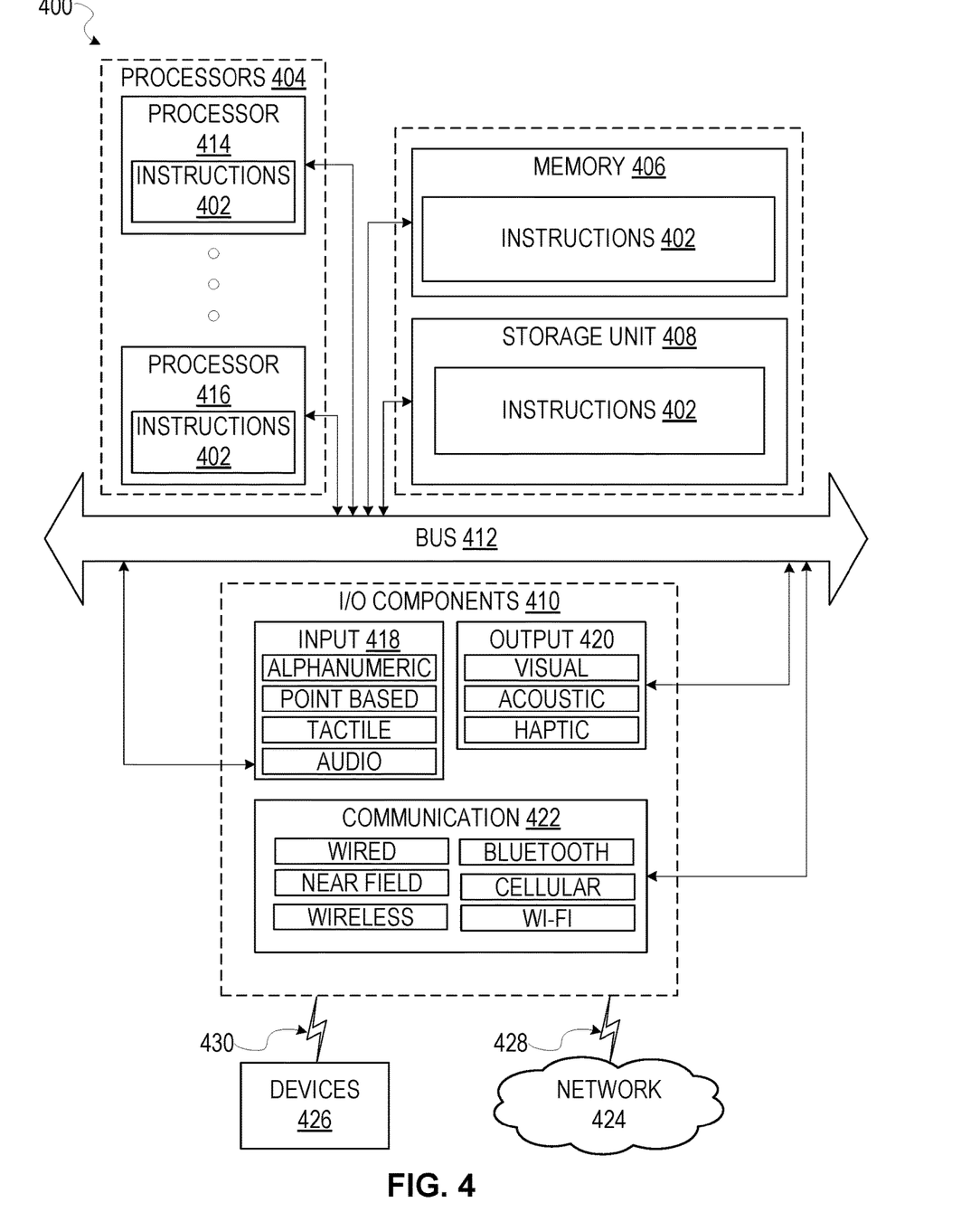
FIG. 4 is a block diagram illustrating components of a machine able to read instructions from a machine-readable medium, according to some embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. The machine 400 may correspond to one or more of the user devices 110, the policy server 120, the key server 130, or the remote system 140. Specifically, FIG. 4 shows a diagrammatic representation of the machine 400 in the example form of a system, within which instructions 402 (e.g., software, a program, an application, an applet, an app, a driver, or other executable code) for causing the machine 400 to perform any one or more of the methodologies discussed herein may be executed. For example, the instructions 402 include executable code that causes the machine 400 to execute the methods 200 and 300. In this way, these instructions transform the general, non-programmed machine into a particular machine programmed to carry out the described and illustrated functions in the manner described herein. The machine 400 may operate as a standalone device or may be coupled (e.g., networked) to other machines.

By way of non-limiting example, the machine 400 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 402, sequentially or otherwise, that specify actions to be taken by machine 400. Further, while only a single machine 400 is illustrated, the term "machine" shall also be taken to include a collection of machines 400 that individually or jointly execute the instructions 402 to perform any one or more of the methodologies discussed herein.

The machine 400 may include processors 404, memory 406, storage unit 408 and I/O components 410, which may be configured to communicate with each other such as via a bus 412. In an example embodiment, the processors 404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 414 and processor 416 that may execute instructions 402. The term "processor" is intended to include multi-core processors that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core process), multiple processors with a single core, multiple processors with multiples cores, or any combination thereof.

The memory 406 (e.g., a main memory or other memory storage) and the storage unit 408 are both accessible to the processors 404 such as via the bus 412. The memory 406 and the storage unit 408 store the instructions 402 embodying any one or more of the methodologies or functions described herein. The instructions 402 may also reside, completely or partially, within the memory 406, within the storage unit 408, within at least one of the processors 404 (e.g., within the processor's cache memory), or any suitable combination thereof, during execution thereof by the machine 400. Accordingly, the memory 406, the storage unit 408, and the memory of processors 404 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 402. The term "machine-readable medium" shall also be taken to include any medium, or combination of multiple media, that is capable of storing instructions (e.g., instructions 402) for execution by a machine (e.g., machine 400), such that the instructions, when executed by one or more processors of the machine 400 (e.g., processors 404), cause the machine 400 to perform any one or more of the methodologies described herein (e.g., methods 200 and 300). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 410 may include a wide variety of components to receive input, provide output, produce output, transmit information, exchange information, capture measurements, and so on. The specific I/O components 410 that are included in a particular machine will depend on the type of machine. For example, portable machines such as mobile phones will likely include a touch input device or other such input mechanisms, while a headless server machine will likely not include such a touch input device. It will be appreciated that the I/O components 410 may include many other components that are not specifically shown in FIG. 4. The I/O components 410 are grouped according to functionality merely for simplifying the following discussion and the grouping is in no way limiting. In various example embodiments, the I/O components 410 may include input components 418 and output components 420. The input components 418 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 410 may include communication components 422 operable to couple the machine 400 to a network 424 or devices 426 via coupling 428 and coupling 430, respectively. For example, the communication components 422 may include a network interface component or other suitable device to interface with the network 424. In further examples, communication components 422 may include wired communication components, wireless communication components, cellular communication components, near field communication (NFC) components, Bluetooth® components (e.g., Bluetooth® Low Energy), WiFi® components, and other communication components to provide communication via other modalities. The devices 426 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

The invention claimed is:

1. A policy server comprising: one or more processors; and a memory storing instructions that, when executed by the one or more processors, cause the one or more processors to perform operations comprising: predetermining, based on a security threat level, a number of user devices; receiving, at the policy server, a verification that the predetermined number of user devices provided secret information for booting a remote system; and providing, from the policy server and in response to the received verification, a message for a key server to provide a booting key to the remote system, the key server providing the booting key to the remote system in response to the message and causing the remote system to complete a booting procedure, in response to the message from the policy server, wherein the policy server and the key server are separate machines, wherein the policy server and the key server are part of a first running instance of a fully encrypted system, wherein a second running instance of the fully encrypted system is used to decrypt the first running instance, wherein the first running instance and the second running instance are part of a plurality of running instances of the fully encrypted system, and wherein, if all of the plurality of running instances are offline, one of the plurality of running instances is decrypted manually.

2. The policy server of claim 1, wherein communication between the policy server, the key server, and the remote system occurs via a first encrypted tunnel connecting the policy server to the key server and a second encrypted tunnel connecting the key server to the remote system.

3. The policy server of claim 1, wherein the remote system comprises a virtual system, a container, or a hypervisor.

4. The policy server of claim 1, wherein the remote system comprises a remote client machine or a remote server.

5. The policy server of claim 1, the operations further comprising:
receiving, at the policy server, an indication that the remote system has initiated the booting procedure; and
responsive to the indication, prompting for the verification from a plurality of user devices, the plurality of user devices including the predetermined number of user devices.

6. The policy server of claim 5, the operations further comprising:
receiving, at the policy server, data from a log of the remote system, the data indicating occurrences that occurred prior to the remote system needing to reboot; and
providing the received data to the plurality of user devices together with prompting for the verification from the plurality of user devices.

7. The policy server of claim 1, wherein the policy server comprises the key server, and wherein the key server stores a plurality of booting keys for a plurality of remote systems, and a mapping of remote system identifiers to booting keys.

8. The policy server of claim 7, wherein the key server provides the booting key to the remote system via an encrypted tunnel.

9. The policy server of claim 1, wherein the verification that the predetermined number of user devices provided the secret information is received via an encrypted tunnel connecting the predetermined number of user devices with the policy server.

10. The policy server of claim 1, wherein the message for the key server to provide the booting key to the remote system is transmitted from the policy server to the key server via an encrypted tunnel.

11. The policy server of claim 1, wherein the verification from the predetermined number of user devices is received via a push notification or via a mail server.

12. The policy server of claim 1, wherein the message for the key server to provide the booting key to the remote system comprises authenticated information for providing the booting key to the remote system.

13. A non-transitory machine-readable medium storing instructions that, when executed by one or more machines, cause the one or more machines to perform operations comprising: predetermining, based on a security threat level, a number of user devices; receiving, at a policy server, a verification that the predetermined number of user devices provided secret information for booting a remote system; and providing, from the policy server and in response to the received verification, a message for a key server to provide a booting key to the remote system, the key server providing the booting key to the remote system in response to the message and causing the remote system to complete a booting procedure, in response to the message from the policy server, wherein the policy server and the key server are separate machines, wherein the policy server and the key server are part of a first running instance of a fully encrypted system, wherein a second running instance of the fully encrypted system is used to decrypt the first running instance, wherein the first running instance and the second running instance are part of a plurality of running instances of the fully encrypted system, and wherein, if all of the plurality of running instances are offline, one of the plurality of running instances is decrypted manually.

14. The machine-readable medium of claim 13, wherein communication between the policy server, the key server, and the remote system occurs via a first encrypted tunnel connecting the policy server to the key server and a second encrypted tunnel connecting the key server to the remote system.

15. The machine-readable medium of claim 13, wherein the remote system comprises a virtual system, a container, or a hypervisor.

16. The machine-readable medium of claim 13, wherein the remote system comprises a remote client machine or a remote server.

17. The machine-readable medium of claim 13, the operations further comprising:
receiving, at the policy server, an indication that the remote system has initiated the booting procedure; and
responsive to the indication, prompting for the verification from a plurality of user devices, the plurality of user devices including the predetermined number of user devices.

18. The machine-readable medium of claim 17, the operations further comprising:
receiving, at the policy server, data from a log of the remote system, the data indicating occurrences that occurred prior to the remote system needing to reboot; and
providing the received data to the plurality of user devices together with prompting for the verification from the plurality of user devices.

19. The machine-readable medium of claim 13, wherein the policy server comprises the key server, and wherein the key server stores a plurality of booting keys for a plurality of remote systems, and a mapping of remote system identifiers to booting keys.

20. A method comprising: predetermining, based on a security threat level, a number of user devices; receiving, at a policy server, a verification that the predetermined number of user devices provided secret information for booting a remote system; and providing, from the policy server and in response to the received verification, a message for a key server to provide a booting key to the remote system, the key server providing the booting key to the remote system in response to the message and causing the remote system to complete a booting procedure, in response to the message from the policy server, wherein the policy server and the key server are separate machines, wherein the policy server and the key server are part of a first running instance of a fully encrypted system, wherein a second running instance of the fully encrypted system is used to decrypt the first running instance, wherein the first running instance and the second running instance are part of a plurality of running instances of the fully encrypted system, and wherein, if all of the plurality of running instances are offline, one of the plurality of running instances is decrypted manually.

* * * * *

UNITED STATES PATENT AND TRADEMARK OFFICE
CERTIFICATE OF CORRECTION

PATENT NO. : 10,904,232 B2  
APPLICATION NO. : 16/561912  
DATED : January 26, 2021  
INVENTOR(S) : Cassidy et al.

Page 1 of 1

It is certified that error appears in the above-identified patent and that said Letters Patent is hereby corrected as shown below:

In the Claims

In Column 11, Line 2, in Claim 1, after "comprising:", insert a line break

In Column 11, Line 3, in Claim 1, after "and", insert a line break

In Column 11, Line 5, in Claim 1, after "comprising:", insert a line break

In Column 11, Line 6, in Claim 1, after "devices;", insert a line break

In Column 11, Line 9, in Claim 1, after "and", insert a line break

In Column 12, Line 16, in Claim 13, after "comprising:", insert a line break

In Column 12, Line 17, in Claim 13, after "devices;", insert a line break

In Column 12, Line 20, in Claim 13, after "and", insert a line break

In Column 13, Line 4, in Claim 20, after "comprising:", insert a line break

In Column 13, Line 5, in Claim 20, after "devices;", insert a line break

In Column 13, Line 8, in Claim 20, after "and", insert a line break

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*